(12) United States Patent
Lee et al.

(10) Patent No.: US 8,218,480 B2
(45) Date of Patent: Jul. 10, 2012

(54) SYSTEM AND METHOD FOR TRANSMITTING/RECEIVING SIGNAL IN COMMUNCATION SYSTEM

(75) Inventors: Mi-Hyun Lee, Seoul (KR); Jae-Weon Cho, Suwon-si (KR); Ho-Kyu Choi, Seongnam-si (KR); Ki-Chun Cho, Suwon-si (KR); Tang Yang, Suwon-si (KR); Hyun-Kyu Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1082 days.

(21) Appl. No.: 12/154,317

(22) Filed: May 22, 2008

(65) Prior Publication Data

US 2008/0291884 A1 Nov. 27, 2008

(30) Foreign Application Priority Data

May 22, 2007 (KR) .................. 10-2007-0049979
Oct. 17, 2007 (KR) .................. 10-2007-0104766

(51) Int. Cl.
*H04W 4/00* (2009.01)
*H04L 12/66* (2006.01)
*H04J 3/16* (2006.01)
*H04J 3/22* (2006.01)

(52) U.S. Cl. ................ 370/328; 370/352; 370/465

(58) Field of Classification Search .......... 370/328, 370/352, 465
See application file for complete search history.

(56) References Cited

U.S. PATENT DOCUMENTS

2006/0088008 A1   4/2006   Kim
2008/0084814 A1*  4/2008   Venkatachalam ......... 370/203

FOREIGN PATENT DOCUMENTS

KR   1020050082655 A   8/2005
KR   100656827 B1      12/2006

OTHER PUBLICATIONS

International Search Report dated Oct. 31, 2008 in connection with PCT Application No. PCT/KR2008/002869.

* cited by examiner

*Primary Examiner* — Ronald Abelson

(57) ABSTRACT

A system and method are disclosed for transmitting/receiving a signal in a communication system in which a first communication system and a second communication system coexist, the second communication system being evolved from the first communication system and being capable of using a control signal and a broadcast signal used in the first communication system. The method of transmitting a signal includes the steps of transmitting a first message including common control information and frame control information for the first communication system in a first frame, transmitting a second message including common control information and frame control information for the second communication system in a second frame, and signaling location information of the transmitted second message in the second frame.

54 Claims, 13 Drawing Sheets

| A | A | A | A | ← 410 |

| B | jB | −B | −jB | ← 420 |

| C | −C | C | −C | ← 430 |

| D | −jD | −D | jD | ← 440 |

FIG.4A

| B | −B | ← 460 |

| B | −B | B | ← 470 |

| −B | B | ← 480 |

| −B | B | −B | ← 490 |

FIG.4B

SYSTEM AND METHOD FOR TRANSMITTING/RECEIVING SIGNAL IN COMMUNCATION SYSTEM

CROSS-REFERENCE TO RELATED APPLICATION(S) AND CLAIM OF PRIORITY

This application claims priority to applications entitled "System and Method for Transmitting/Receiving Signal in Communication System" filed in the Korean Industrial Property Office on May 22, 2007 and Oct. 17, 2007 and assigned Ser. Nos. 10-2007-0049979 and 10-2007-0104766 respectively, the contents of which are hereby incorporated by reference.

TECHNICAL FIELD OF THE INVENTION

The present invention relates to a communication system, and more particularly to a system and method for transmitting and receiving a signal in a broadband wireless access communication system.

BACKGROUND OF THE INVENTION

Communication systems have evolved in the form of a system that can provide various services, such as broadcasting, multimedia images, multimedia messages, etc. In particular, active research is being conducted to provide users with high-speed services with various quality of services (QoS) in a next generation communication system. Also, a fourth generation communication system is being developed so as to provide high-speed mobile users with data services at a data transfer rate of 100 Mbps or greater and to provide low-speed mobile users with data services at a data transfer rate of 1 Gbps or greater while departing from services centered on voice and packet data communications.

Systems approximate to the fourth generation mobile communication system include a portable Internet system. The portable Internet system is also called a mobile WiMAX communication system or a Wibro (Wireless Broadband) communication system, and is compatible with communication systems based on IEEE (Institute of Electrical and Electronics Engineers) 801.16.

The mobile WiMAX communication system has been already commercialized, and research is being conducted to evolve the mobile WiMAX communication system into a mobile WiMAX evolution communication system. The mobile WiMAX evolution communication system is aimed at supporting mobility up to 300 km per hour, supporting variable bandwidths, minimizing overhead, and so forth.

The mobile WiMAX evolution communication system is intended to employ evolved technologies. Such evolved technologies include the multiple antenna technology, the IPv6 technology, the multicast/broadcast service technology, and the like.

Supposing that the mobile WiMAX communication system and the mobile WiMAX evolution communication system are implemented, there may be a system in which the mobile WiMAX communication system and the mobile WiMAX evolution communication system coexist. Therefore, when the mobile WiMAX communication system and the mobile WiMAX evolution communication system coexist in a certain system, a way to operate the system while simultaneously supporting the operation of the mobile WiMAX evolution communication system, for example, a way to provide information indicating a structure for transmitting broadcast information and a transmit frame structure in the mobile WiMAX evolution communication system, must be defined.

SUMMARY OF THE INVENTION

To address the above-discussed deficiencies of the prior art, it is a primary object of the present invention to solve at least the above-mentioned problems occurring in the prior art, and the present invention provides a system and method for allocating resources in a communication system.

Further, the present invention provides a system and method for transmitting/receiving a signal in a communication system.

Further, the present invention provides a system and method for transmitting/receiving a signal to provide information indicating frame control information and a structure for transmitting broadcast information in a broadband wireless access communication system.

In accordance with an aspect of the present invention, there is provided a method of transmitting a signal in a communication system in which a first communication system and a second communication system coexist, the second communication system being evolved from the first communication system and being capable of using a control signal and a broadcast signal used in the first communication system, the method including the steps of transmitting a first message including common control information and frame control information for the first communication system in a first frame; transmitting a second message including common control information and frame control information for the second communication system in a second frame; and signaling location information of the transmitted second message in the second frame.

In accordance with another aspect of the present invention, there is provided a method of receiving a signal in a communication system in which a first communication system and a second communication system coexist, the second communication system being evolved from the first communication system and being capable of using a control signal and a broadcast signal used in the first communication system, the method including the steps of receiving a first message including common control information and frame control information for the first communication system in a first frame; receiving a second message including common control information and frame control information for the second communication system in a second frame; and acquiring location information of the second message in the second frame.

In accordance with yet another aspect of the present invention, there is provided a system for transmitting a signal in a communication system in which a first communication system and a second communication system coexist, the second communication system being evolved from the first communication system and being capable of using a control signal and a broadcast signal used in the first communication system, the system including a base station for transmitting a first message including common control information and frame control information for the first communication system in a first frame, transmitting a second message including common control information and frame control information for the second communication system in a second frame, and signaling location information of the transmitted second message in the second frame.

In accordance with still yet another aspect of the present invention, there is provided a system for receiving a signal in a communication system in which a first communication system and a second communication system coexist, the second communication system being evolved from the first communication system and being capable of using a control signal and a broadcast signal used in the first communication system, the system including a mobile station for receiving a first message including resource allocation information for the first communication system in a first frame, receiving a second message including resource allocation information for the second communication system in a second frame, and acquiring location information of the second message in the second frame.

In accordance with still yet another aspect of the present invention, there is provided a method of receiving a signal in a communication system in which a third communication system including a first communication system and a second communication system evolved from and coexisting with the first communication system is mingled with a fourth communication system including only the second communication system, the method including the steps of determining if a reference signal for the fourth communication system is received; when the reference signal for the fourth communication system is not received, receiving a reference signal for the first communication system, and acquiring synchronization; determining if common control information for the second communication system is received; and if the common control information for the second communication system is received, decoding the common control information for the second communication system.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4a and 4b are views each illustrating a DL subframe in a communication system in accordance with an exemplary embodiment of the present invention;

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

An exemplary embodiment of the present invention proposes a frame structure for use in a communication system, for example, a broadband wireless access communication system, in which a first communication system (e.g., communication system based on IEEE 802.16, i.e., IEEE 802.16 communication system) and a second communication system improved in performance as compared to the first communication system coexist, and a system and method for transmitting a signal to provide information indicating the proposed frame structure. Also, another exemplary embodiment of the present invention proposes a system and method for transmitting/receiving a signal in a communication system in which the second communication system does not coexist with the first communication system, that is, in which only the second communication system exists. For example, even in the communication system in which the first and second communication systems coexist, a wired/wireless network may be operated only by the second communication system capable of providing improved performance.

In the following description, the first communication system will be exemplified by an IEEE 802.16 communication system, and the second communication system will be exemplified by a communication system for improving the performance of the IEEE 802.16 communication system. However, the frame structure and the system and method for transmitting/receiving a signal, as proposed in the present invention, may also be applied to CDMA (Code Division Multiple Access) communication systems, WCDMA (Wideband Code Division Multiple Access) communication systems, and GSM (Global System for Mobile Telecommunication)-based communication systems.

Also, the first and second communication systems will be described on the assumption that their signals are time division multiplexed (TDM) or frequency division multiplexed (FDM) in the same frame by way of example. Particularly, in the following description, the first communication system will be exemplified by the mobile WiMAX communication system, and the second communication system will be exemplified by the mobile WiMAX evolution communication system.

Figure 1:
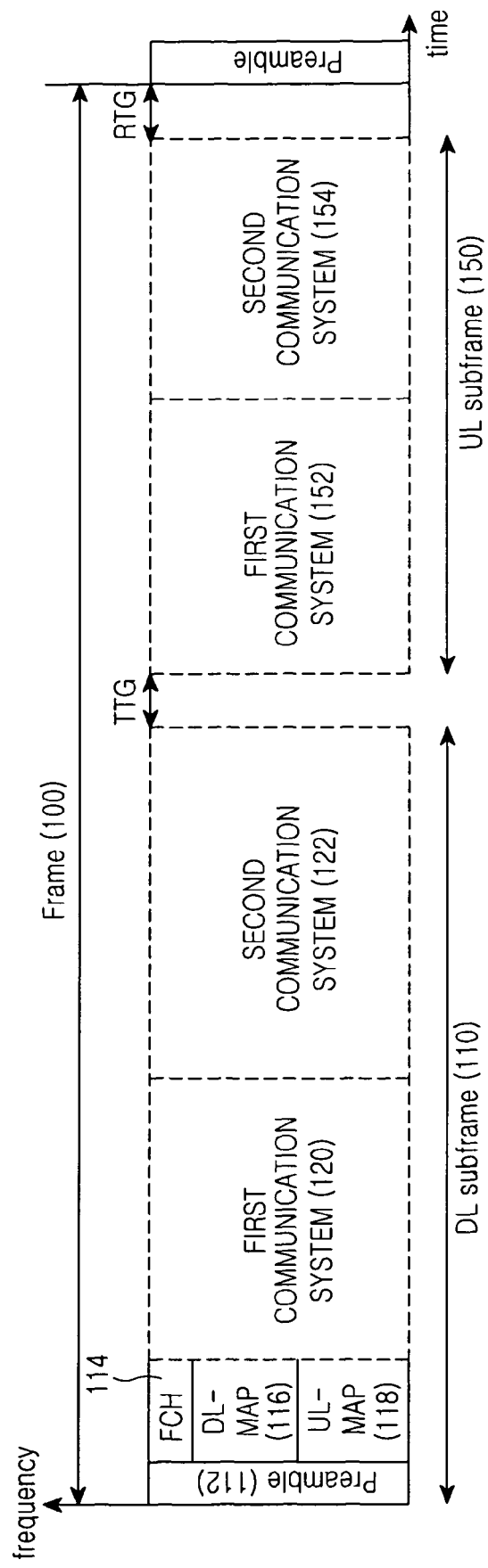
FIG. 1 is a view schematically illustrating a frame structure in a communication system in accordance with an exemplary embodiment of the present invention.

When the first and second communication systems coexist in the communication system according to the present invention, resources for the first and second communication systems are allocated, frame control information is configured corresponding to the allocated resources, and the configured frame control information is indicated through specific signaling. With regard to this, the present invention proposes to use a broadcast channel (BCH) as a common control channel through which to transmit control information for the second communication system and inform a mobile station (MS) of location information of the BCH region in the communication according to the present invention. Here, L1 signaling corresponding to signal characteristics and patterns in the time and frequency domains is determined as the specific signaling, and location information and decoding information of the BCH region are acquired through the L1 signaling. Reference will now be made to FIG. 1 schematically illustrating a frame structure in a communication system according to an exemplary embodiment of the present invention.

Referring to FIG. 1, the frame 100 is divided into a downlink (DL) subframe 110 and an uplink (UL) subframe 150 by a transmit transition gap (TTG). A receive transition gap (RTG) distinguishes between frames.

The DL subframe 110 includes a preamble region 112, a frame control header (FCH) region 114, a DL-MAP region 116, a UL-MAP region 118, a data burst region 120 for data transmission/reception in the first communication system (hereinafter referred to as a "first communication system region"), and a data burst region 122 for data transmission/reception in the second communication system (hereinafter referred to as a "second communication system region") The UL subframe 150 includes two data burst regions, that is, a first communication system region 152 and a second communication system region 154.

The preamble region 112 is a region through which to transmit a preamble signal common to the first and second communication systems and used for synchronization acquisition, that is, synchronization acquisition between a transmitter and a receiver (e.g., between a base station (BS) and a mobile station) in the first and second communication systems, and cell search. The FCH region 114 through which transmit frame control information for the first communication system includes information about modulation and coding scheme (MCS) applied to the MAP regions (i.e., the DL-MAP region 116 and the UL-MAP region 118), information about the lengths of the DL-MAP region 116 and the UL-MAP region 118, and so forth. The DL-MAP region 116 is a region through which to transmit a DL-MAP message, and the UL-MAP region 118 is a region through which to transmit a UL-MAP message. The DL-MAP and UL-MAP messages include location information of DL and UL burst regions, information about an MCS, and the like.

As an example, a QPSK (Quadrature Phase Shift Keying) modulation scheme and a coding rate of $1/12$ or $1/16$ are applied to each of the FCH region 114 and the DL/UL-MAP region 116, 118.

In the frame structure for use in the communication system in which the first and second communication systems coexist as described above, it must be possible to operate the first and second communication systems independently of each other.

Figure 2A:
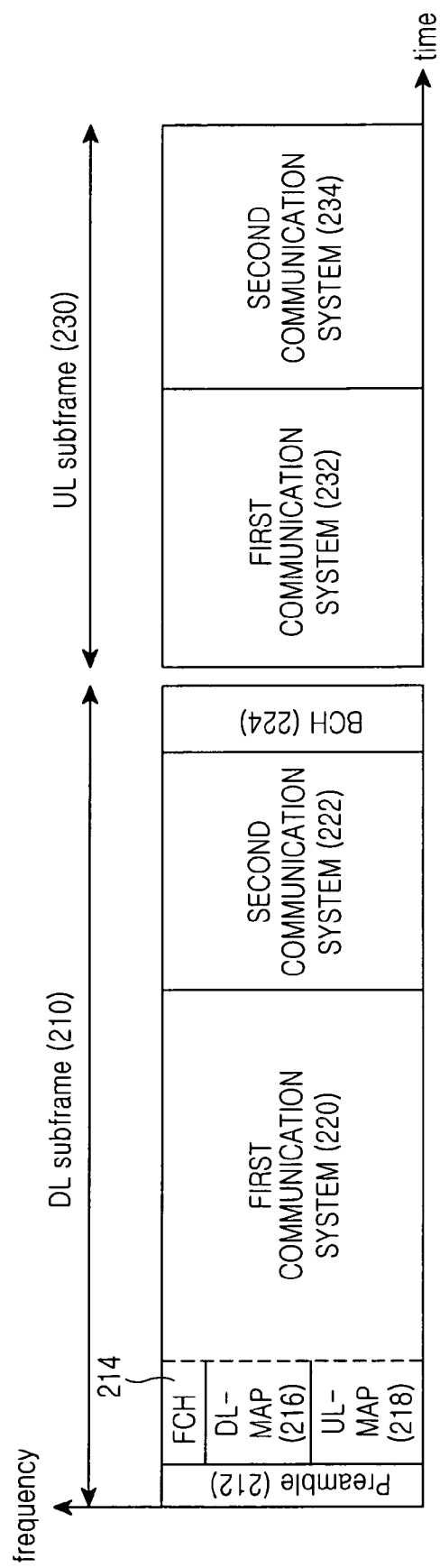
FIGS. 2a and 2b are views, each schematically illustrating a frame structure in a communication system in accordance with an exemplary embodiment of the present invention.
Figure 2B:
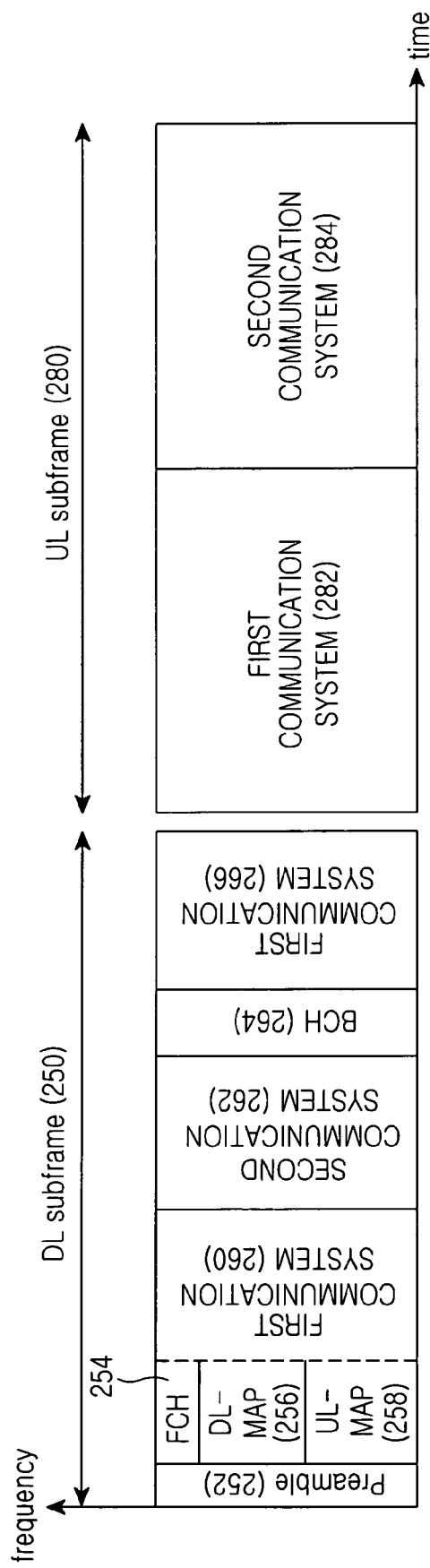

FIGS. 2a and 2b each schematically illustrate a frame structure in a communication system according to an exemplary embodiment of the present invention. In FIGS. 2a and 2b showing that the first and second communication system regions are time division multiplexed (TDM) in the same frame, BCH information is transmitted in a different location.

Referring to FIGS. 2a and 2b, the frame is divided into a DL subframe 210, 250 and a UL subframe 230, 280. The DL subframe 210, 250 includes a preamble region 212, 252, an FCH region 214, 254, a DL-MAP region 216, 256, a UL-MAP region 218, 258, a first communication system region 220, 260, 266, a second communication system 222, 262, 266, and a BCH region 224, 264. The UL subframe 230, 280 includes two data burst regions, that is, a first communication system region 232, 282 and a second communication system region 234, 284. In FIG. 2b, the region designated by reference numeral "266" may be the first communication system region or the second communication system region.

An MS belonging to the second communication system acquires synchronization by using a preamble signal received through the preamble region 212, 252, and searches for a BCH so as to acquire frame control information for the second communication system. The frame control information is included in the second communication system region of the DL subframe 210, 250, the second communication system region of the UL subframe 230, 280, and the BCH region 224, 264. That is, the MS belonging to the second communication system acquires synchronization by using the preamble signal of the first communication system and then searches for the BCH region of the second communication system without decoding the FCH information 214, 254 and MAP information 216, 218, 256, 258 of the first communication system.

The BCH region 224, 264 includes frame configuration information, system information, and cell information for the second communication system. Thus, the MS belonging to the second communication system recognizes the frame configuration information by confirming the location of the BCH region 224, 264 and decoding information for the BCH region 224, 264 and then decoding a signal provided through the BCH region 224, 264. Based on the recognized frame configuration information, the MS recognizes the second communication system region 222, 262, 266 in the DL subframe 210, 250 and the second communication system region 234, 284 in the UL subframe 230, 280.

With regard to this, the BCH region 224, 264 may be located in a given region of the DL subframe 210, 250 in a manner corresponding to the ratio between the DL region and the UL region and the coexistence ratio of the first and second communication systems. Here, the given region may be a region temporally following the second communication system region 222, 262. That is, the BCH region may be located in a region between a specific time interval and the last time interval, as illustrated in FIG. 2a, or may be located in at least one time interval between the second communication system region 262 and the first communication system region 266, as illustrated in FIG. 2b. The BCH region may be configured by any symbol interval or according to an orthogonal frequency division multiple access (OFDMA) scheme.

Hereinafter, for the convenience of explanation, a description will be given with regard to FIG. 2a. However, the following description may also be applied to a case where the BCH region 264 is located in a time interval between the second communication system region 262 and the first communication system region 266, as illustrated in FIG. 2b, or the BCH region is located in another given region.

The BCH region 224, 264 may be included in each frame or may be included in frames in a certain cycle. Information included in the BCH region 224, 264 makes it possible to recognize the DL region of the second communication system in a frame where the first and second communication systems coexist. Also, a signal broadcasted through the BCH region 224, 264 may employ a coding rate lower than that in the first communication system.

Figure 3A:
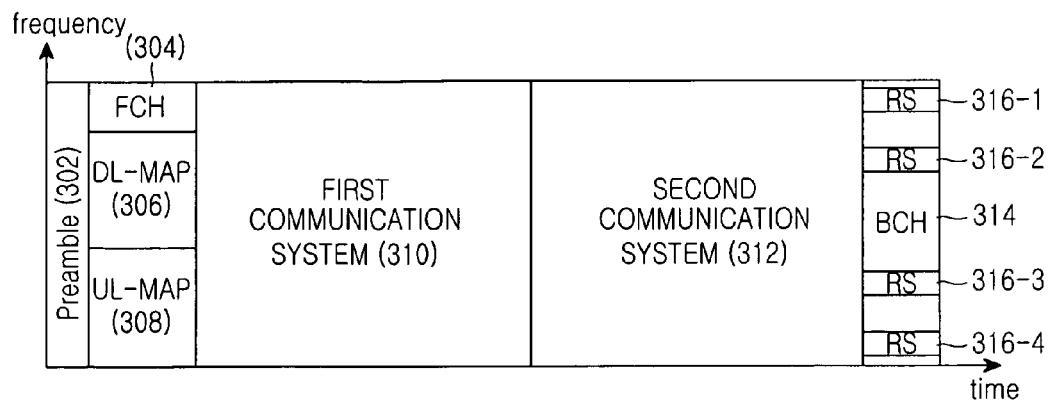
FIGS. 3a and 3b are views, each illustrating a DL subframe in a communication system in accordance with an exemplary embodiment of the present invention.
Figure 3B:
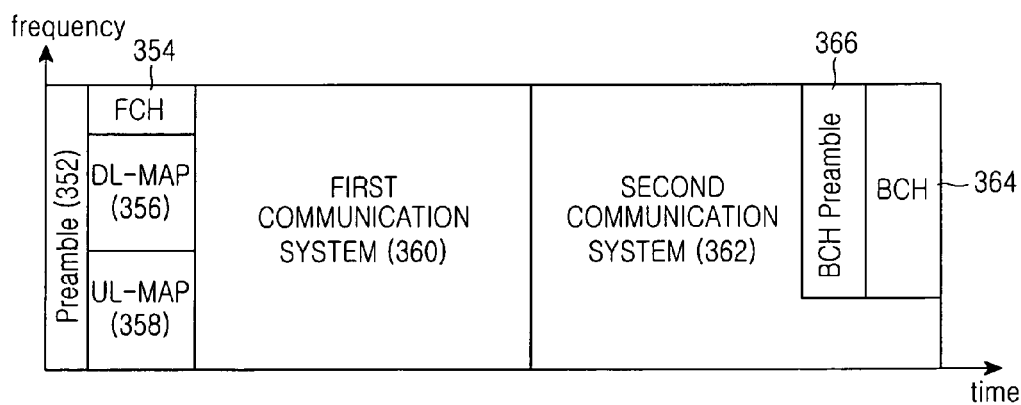

FIGS. 3a and 3b each illustrate a DL subframe in a communication system according to an exemplary embodiment of the present invention. These drawings correspond to views for explaining how to acquire location information of a BCH region through L1 signaling in a communication system according to an exemplary embodiment of the present invention.

Referring to FIG. 3a, the DL subframe includes a preamble region 302, an FCH region 304, a DL-MAP region 306, a UL-MAP region 308, a first communication system region 310, a second communication system region 312, and a BCH region 314. The BCH region 314 includes a plurality of reference signal (RS) regions 316-1 to 316-4.

The RS regions 316-1 to 316-4 in the BCH region 314 include reference signals (RSs) for detecting the location of the BCH region 314 through L1 signaling corresponding to signal characteristics and patterns in the time and frequency domains, as mentioned above. Here, the RSs are defined by signals that have different forms from those of reference signals (e.g., pilot signals) in other channels, so that the MS recognizes that a region including the RSs is the BCH region 314. A physical channel occupied by the BCH may occupy a two-dimensional region defined by the time and frequency domains, as well as an OFDMA symbol unit.

In other words, the MS belonging to the second communication system acquires synchronization by using a preamble signal transmitted through the preamble region 302 and then conducts fast Fourier transform (FFT) for a received signal to detect L1 signaling, that is, a specific RS pattern, thereby recognizing that the pertinent time interval is a time interval corresponding to the BCH region 314. The specific RS pattern is a sequence which the MS has already recognized through prearrangement. Thus, the MS detects the L1 signaling by correlating the received signal with the prearranged signal sequence.

Referring to FIG. 3b, the DL subframe includes a preamble region 352, an FCH region 354, a DL-MAP region 356, a UL-MAP region 358, a first communication system region 360, a second communication system region 362, and a BCH region 364.

In FIG. 3b, the MS belonging to the second communication system recognizes the BCH region 364 through a BCH preamble region 366 corresponding to a prior signal pattern or a posterior signal pattern. Here, the BCH preamble region 366 may be located in a time interval preceding the BCH region 364 so as to acquire location information of the BCH region 364 through the prior signal pattern, or may be located in a time interval following the BCH region 364 so as to acquire location information of the BCH region 364 through the posterior signal pattern. Also, the BCH region is provided at a certain interval from the prior or posterior signal, and a physical channel occupied by the BCH may occupy a two-dimensional region defined by the time and frequency domains, as well as an OFDMA symbol unit, or may occupy a partial frequency domain or the overall frequency domain for a given time domain.

In other words, the MS belonging to the second communication system acquires synchronization by using a preamble signal transmitted through the preamble region 352, conducts FFT for a received signal, and then detects a prior or posterior signal pattern indicative of the BCH region 364, that is, L1 signaling, to acquire location information of the BCH region 364.

A specific signaling scheme corresponding to signal characteristics and patterns in timer and frequency domains may be divided into a scheme defining OFDMA signal characteristics and patterns obtainable through subcarrier sets according to certain rules to use them for indicating a physical channel over which to transmit the BCH, and a scheme defining OFDM signal characteristics obtainable by mapping resources according to certain rules, that is, repetitive signal patterns, to use them for indicating a physical channel over which transmit the BCH. For example, in the OFDMA communication system, a signal transmitted through a subcarrier set with a regular interval in the frequency domain has a time domain pattern that is repeated at the regular intervals. By defining such a repetitive time domain pattern, specific signaling is detected corresponding to the autocorrelation of the repetitive pattern to thereby acquire the location of the BCH. More specially, in the scheme defining and using the repetitive patterns, let M be a regular interval in the frequency domain. Then, M repetitive patterns, each of which spans L intervals, exist through M subcarrier sets, and the FFT size or the total number of subcarriers, N, is L×M. Thus, a signal transmitted through the subcarrier set with an interval of M can be represented by the following equation:

$$x(n) = \sum_{k=0}^{N-1} X(k)e^{j2\pi kn/N} = \sum_{l=0}^{N/M-1} X(M \times l + m)e^{j2\pi(l+m/M)n/(N/M)}. \quad [\text{Eqn. 1}]$$

In Equation 1, n and l each denote a subcarrier index, and m denotes a repetitive pattern index. A signal as given in Equation 1 is represented by the following equation in the time domain:

$$x(n) = \sum_{l=0}^{N/M-1} X(M \times l + m)e^{j2\pi\left(\frac{ln}{N/M} + \frac{mn}{M} + lp + \frac{pm}{M}\right)} = \quad [\text{Eqn. 2}]$$

$$e^{j2\pi\left(\frac{n}{N} - \frac{p}{M}\right)} \sum_{l=0}^{N/M-1} X(M \times l + m)e^{j2\pi\frac{ln}{N/M}}$$

In Equations 1 and 2, l=0, . . . , N/M−1, p=0, . . . , M−1, and $e^{j2\pi lp}=1$. FIG. 4a illustrates signal patterns obtained by the above equations according to repetitive pattern indexes in the case of M=4. Reference numeral "410" designates a signal pattern in the case of m=0, reference numeral "420" designates a signal pattern in the case of m=1, reference numeral "430" designates a signal pattern in the case of m=2, and reference numeral "440" designates a signal pattern in the case of m=3. Therefore, the MS belonging to the second communication system acquires synchronization and then detects a repetitive pattern corresponding to the autocorrelation of a received signal in the time domain to acquire location information of the BCH region from a corresponding location when the detected repetitive pattern satisfies a repetitive pattern predefined between the MS and the BS.

FIGS. 4a and 4b each symbolize a BCH region of a DL subframe in a communication system according to another exemplary embodiment of the present invention.

Referring to FIG. 4a, in the L1 signaling scheme corresponding to a signal characteristic/pattern in the time domain, a plurality of subcarrier set patterns are defined, and the location of a BCH and a BCH transmit mode, corresponding to the correlation of a transmitted sequence, are jointly acquired from the plurality of defined patterns. For example, the BCH transmit mode covers the following four cases, where QPSK, a coding rate of ½, and a convolutional code (CC) are assumed in each BCH transmit mode. The BCH transmit mode includes a transmit diversity technique, an MCS (Modulation and Coding Scheme), a repetition count, a channel coding scheme, cycle, interval information, etc.

1. single transmit antenna, cycle: 2 slots, interval: 24 slots, repetition count: 12
2. single transmit antenna, cycle: 2 slots, interval: 48 slots, repetition count: 24
3. MIMO (Multiple Input Multiple Output) transmit antenna diversity, for example, space-frequency block-coded (SFBC) scheme, cycle: 2 slots, interval: 24 slots, repetition count: 12
4. MIMO transmit antenna diversity, cycle: 2 slots, interval: 48 slots, repetition count: 24

By way of example, 4 different subcarrier set patterns may be configured and used as different subcarrier set patterns, that is, pattern #1 410 uses a set of 4 k subcarriers as a signal pattern, pattern #2 420 uses a set of (4 k+1) subcarriers as a signal pattern, pattern #3 430 uses a set of (4 k+2) subcarriers as a signal pattern, and pattern #4 440 uses a set of (4 k+3) subcarriers as a signal pattern. Here, k is 0, . . . , N/4, and N denotes the FFT size.

A plurality of sequences defined for the same pattern configured by any one of the above-mentioned subcarrier sets may also be used. In this case, correlations between the plurality of defined sequences and a signal received through the same pilot pattern are measured, and a BCH transmit mode is acquired through the transmit mode corresponding to each of the measured correlations. That is, in order to support more diverse transmit modes, a part of a transmit mode is disclosed by a subcarrier set pattern, and the remaining part of the transmit mode is disclosed by a plurality of sequences defined for each pattern, which makes it possible to hierarchically acquire transmit mode information. Thus, not only various repetitive patterns but also various sequences transmitted in the same pattern may be defined. In addition to measuring a correlation characteristic in the time domain, the MS belonging to the second communication system conducts FFT for a received signal, and measures receive power according to respective subcarrier sets in the frequency domain. Location information of the BCH region is acquired by detecting a subcarrier set that has the maximum receive power, and then a BCH transmit mode is detected by measuring correlations between the sequence transmitted through the detected subcarrier set and the known sequences according to transmit modes.

Referring to FIG. 4b, in the L1 signaling scheme corresponding to a signal characteristic/pattern in the time domain, a certain repetitive sequence is used in BCH transmission, and a signal obtained by cyclically delaying or cyclically shifting such a BCH signal with a repetitive characteristic in the time domain is transmitted so as to acquire location information of the BCH region. With regard to this, when a BCH signal with a certain repetitive characteristic is cyclically delayed or shifted by a given value in the time domain, the BCH signal can be represented by the following equation:

$$s(t) = e^{j2\pi f_c t} \sum_{\substack{k=-(N-1)/2 \\ k \neq 0}}^{k=(N-1)/2} X_k \cdot e^{j2\pi k \Delta f(t-T_g)} \cdot e^{j2\pi k N_{cs}/N}. \quad [\text{Eqn. 3}]$$

In Equation 3, $X_k$ denotes a signal transmitted over a physical channel to which a BCH is mapped, N denotes the FFT size, $T_g$ denotes an offset between repetitive sequences, and Ncs denotes that the BCH signal is a value cyclically delayed or shifted in the time domain.

Figure 5:
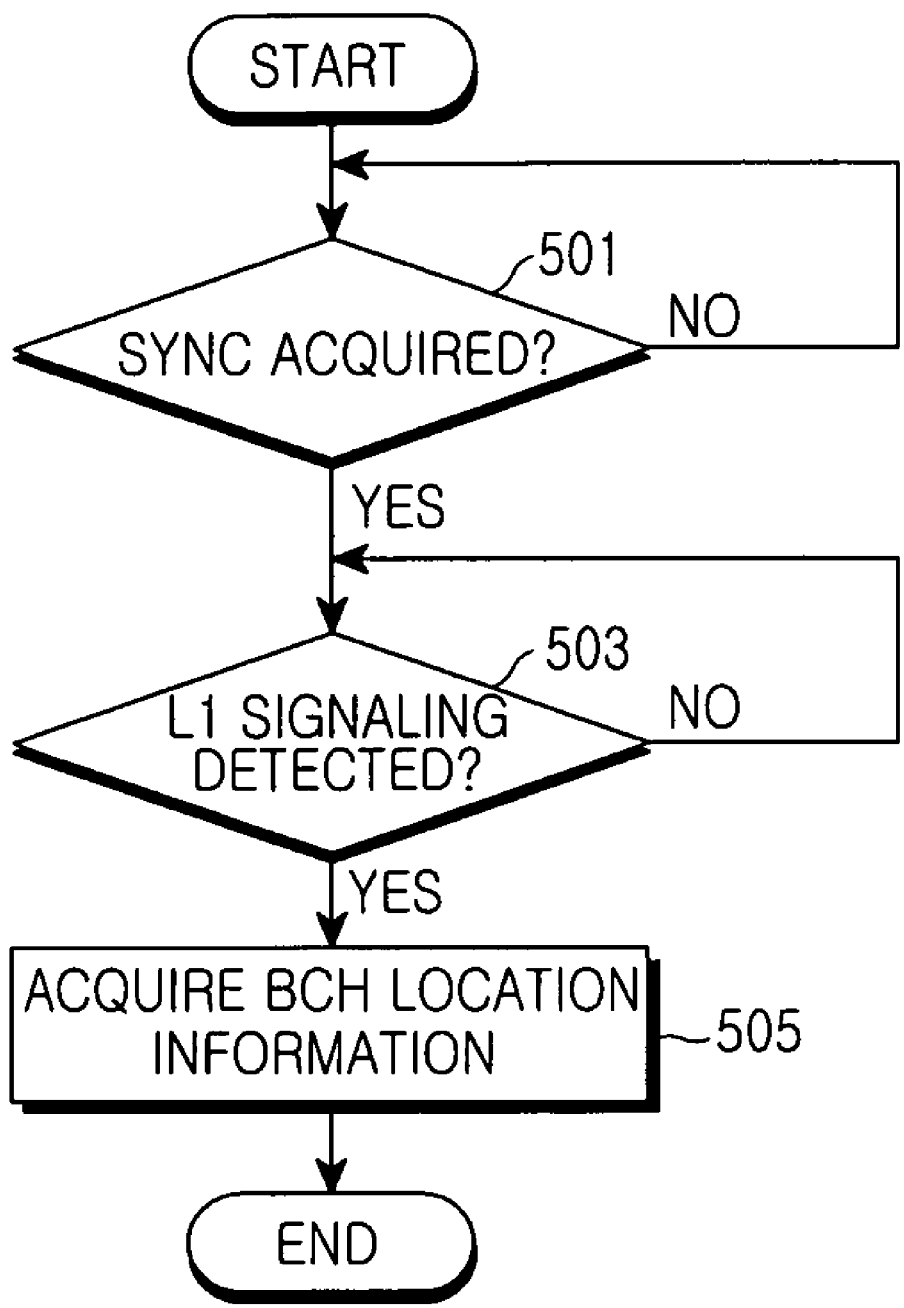
FIG. 5 is a flowchart illustrating a procedure of acquiring BCH location information in a communication system in accordance with an exemplary embodiment of the present invention.

For example, when a signal pattern repeated twice in time domain is used in BCH transmission by using an odd-th subcarrier set, four (4) patterns configured by cyclic delay or cyclic shift may be used, that is, pattern #1 460 uses 0×N/4 sample cyclic shift of the repetitive pattern, pattern #2 470 uses 1×N/4 sample cyclic shift of the repetitive pattern, pattern #3 480 uses 2×N/4 sample cyclic shift of the repetitive pattern, and pattern #4 490 uses 3×N/4 sample cyclic shift of the repetitive pattern. Here, when M patterns are defined, various sequences with different delays or shifts are defined by each N/M sample cyclic delay or shift of the repetitive sequence, and the defined sequences are used as signal patterns. Thus, the MS belonging to the second communication system acquires location information of the BCH region in the above manner corresponding to the correlation of the repetitive signal in the time domain. Reference will now be made to FIG. 5 illustrating a procedure of acquiring a location of a BCH by an MS in a communication system according to an exemplary embodiment of the present invention.

Referring to FIG. 5, in step 501, the MS belonging to the second communication system acquires synchronization by using a preamble signal transmitted through the preamble region, and then proceeds to step 503. In step 503, the MS belonging to the second communication system checks if L1 signaling is detected. That is, if, in step 503, the MS belonging to the second communication system detects an L1 signaling scheme determined corresponding to signal characteristics and patterns in the time and frequency domains, it proceeds to step 505, and acquires BCH location information corresponding to the L1 signaling in step 505.

Figure 6:
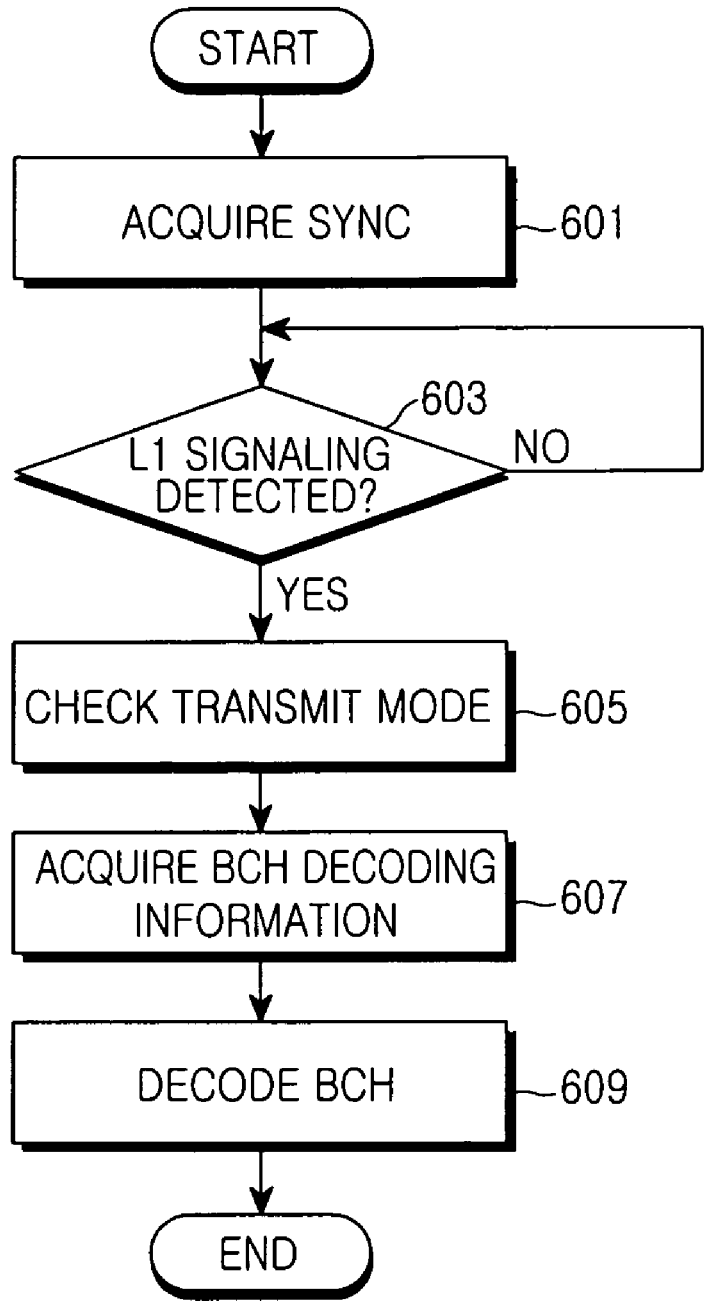
FIG. 6 is a flowchart illustrating a procedure of acquiring BCH location information in a communication system in accordance with an exemplary embodiment of the present invention.

FIG. 6 illustrates a procedure of acquiring BCH transmit mode information by an MS in a communication system according to an exemplary embodiment of the present invention.

Referring to FIG. 6, in step 601, the MS belonging to the second communication system acquires synchronization by using a preamble signal transmitted through the preamble region, and then proceeds to step 603. In step 603, the MS belonging to the second communication system determines if L1 signaling is detected. If the MS detects L1 signaling in step 603, it recognizes a BCH corresponding to the detected L1 signaling, and then proceeds to step 605. In step 605, the MS acquires BCH transmit mode information, and then proceeds to step 607.

In step 607, the MS decodes control information and broadcast information transmitted through the BCH region in a manner corresponding to the acquired BCH transmit mode, and then proceeds to step 609. As described above, there may be BCH transmit modes for various cases, and with regard to this, each transmit mode may have various MCS levels or one basic MSC level (e.g., QPSK ½). In step 609, the MS decodes the BCH in a manner corresponding to the acquired BCH decoding information.

Figure 7:
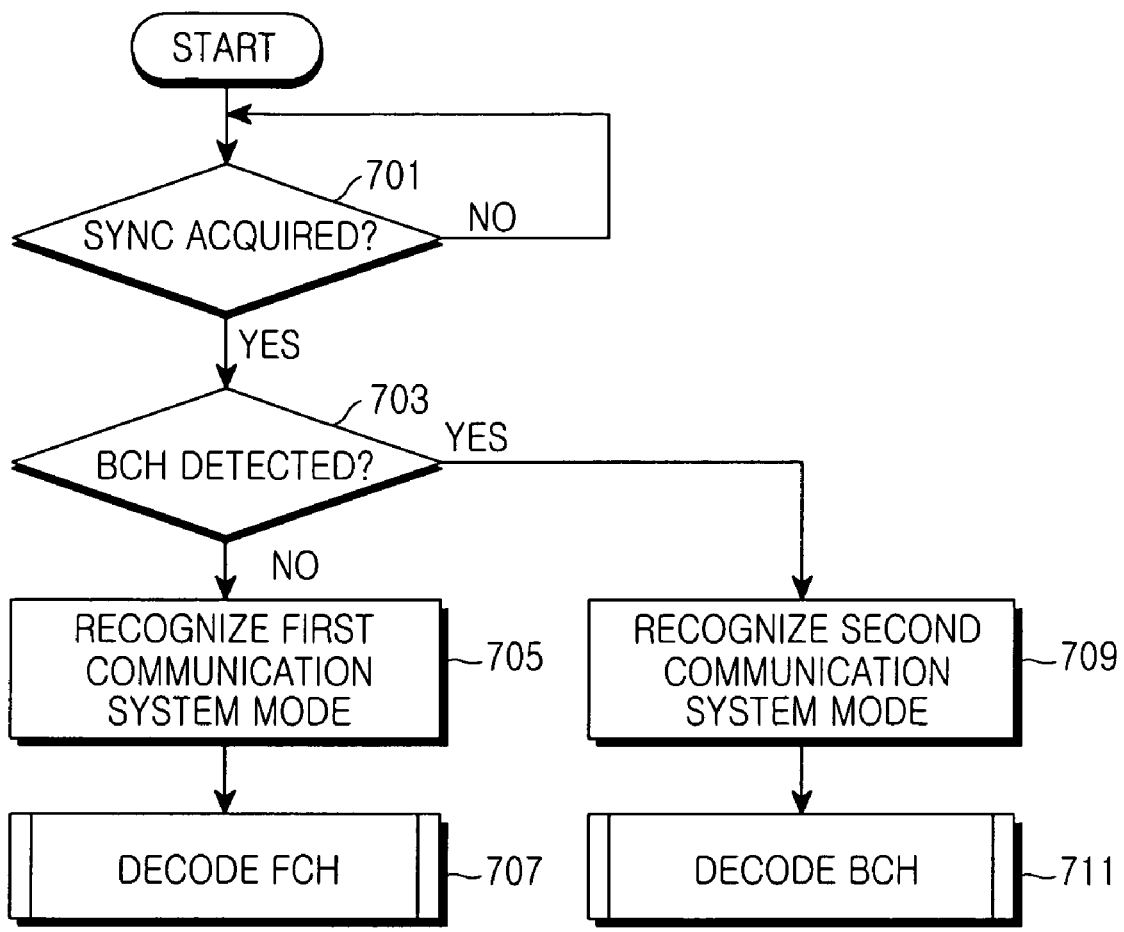
FIG. 7 is a flowchart illustrating a procedure of determining an operation mode between first and second communication systems in a communication system in accordance with an exemplary embodiment of the present invention.

Reference will now be made to FIG. 7 illustrating a procedure of determining an operation mode between first and second communication systems in a communication system according to an exemplary embodiment of the present invention. Here, the first and second communication systems coexist in the same frame. Depending on cell situations, initial access to any system or handover to any system may also be considered.

Referring to FIG. 7, in step 701, the MS searches for a preamble signal to acquire synchronization, and then proceeds to step 703. In step 703, the MS determines if the BCH for the second communication system is detected. If a result of the determination in step 703 shows that the BCH is not detected, in step 705, the MS recognizes that it is provided with communication services by the first communication system, that is, the first communication system is in operation. In step 707, the MS acquires control information for the first communication system by decoding the FCH region.

Contrarily, if a result of the determination in step 703 shows that the BCH for the second communication system is detected, in step 709, the MS recognizes that it is provided with communication services by the second communication system, that is, the second communication system is in operation. In step 711, the MS acquires control information and broadcast information for the second communication system by decoding the BCH.

In step 703, the BCH detection may be performed not by actually checking if a BCH is detected, but by comparing the probability of decoding control information common to the two systems with the probability of detecting control information common to the two systems. That is, the MS may compare the probability of BCH detection in the second communication system with the probability of FCH decoding in the first communication system. The MS proceeds to step 709 if the probability of BCH detection in the second communication system is greater than the probability of FCH decoding in the first communication system, and proceeds to step 705 if the probability of BCH detection in the second communication system is smaller than the probability of FCH decoding in the first communication system, thereby switching to the operation mode of the corresponding communication system.

Reference will now be made to an operation scheme to be applied when a second communication system solely exists without coexisting with a first communication in a communication system according to an exemplary embodiment of the present invention. In the following description, the communication system including only the second communication system will be referred to as a third communication system so as to discern it from the first and second communication systems.

Figure 8:
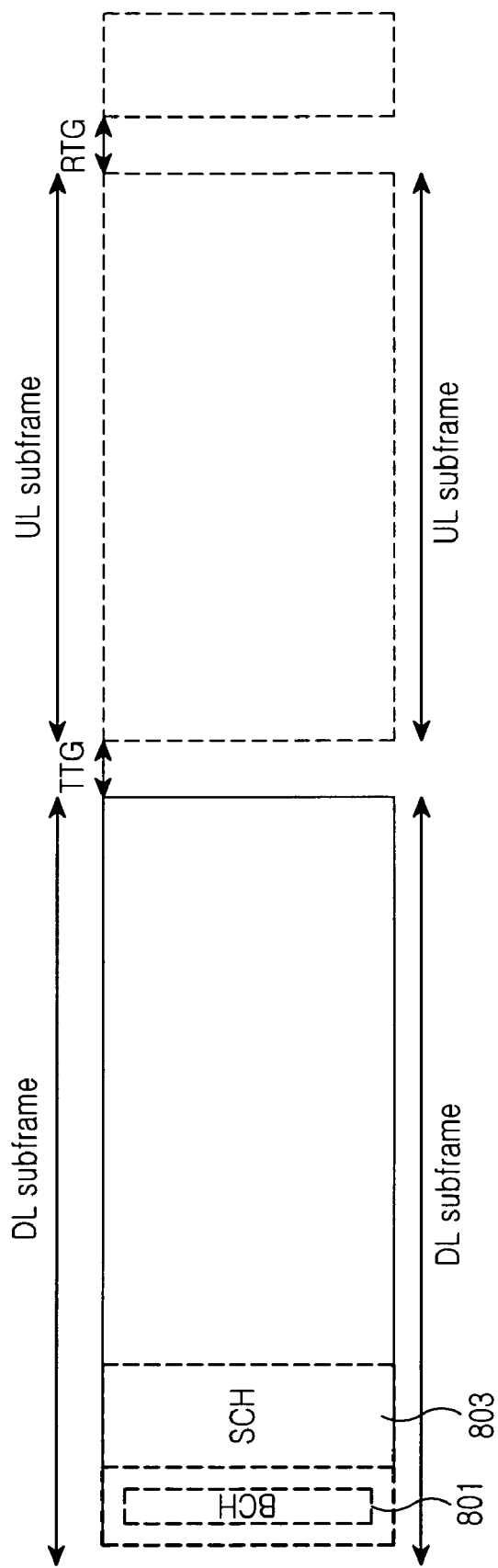
FIG. 8 is a view schematically illustrating a structure of an MS in a communication system in accordance with an exemplary embodiment of the present invention.

FIG. 8 illustrates a frame structure for use in a third communication system according to an exemplary embodiment of the present invention.

Referring to FIG. 8, when the second system operates as the third communication system in which the second communication system solely exists without coexisting with the first communication system, there must be provided a region by which synchronization for the third communication system can be independently performed. The frame structure for the third communication system includes a synchronization channel (SCH) region 803 through which to transmit synchronization information and control information, and a BCH region 801 through which to transmit common control information and broadcast information.

The location of the BCH region 801 may be indicated in the SCH region 803. That is, the location of the BCH region 801 is not searched through a specific detection method, but is indicated by the SCH region 803. The BCH region indicated by the SCH region 803 in the Fth frame may be located in the (F+1)th frame.

Figure 9:
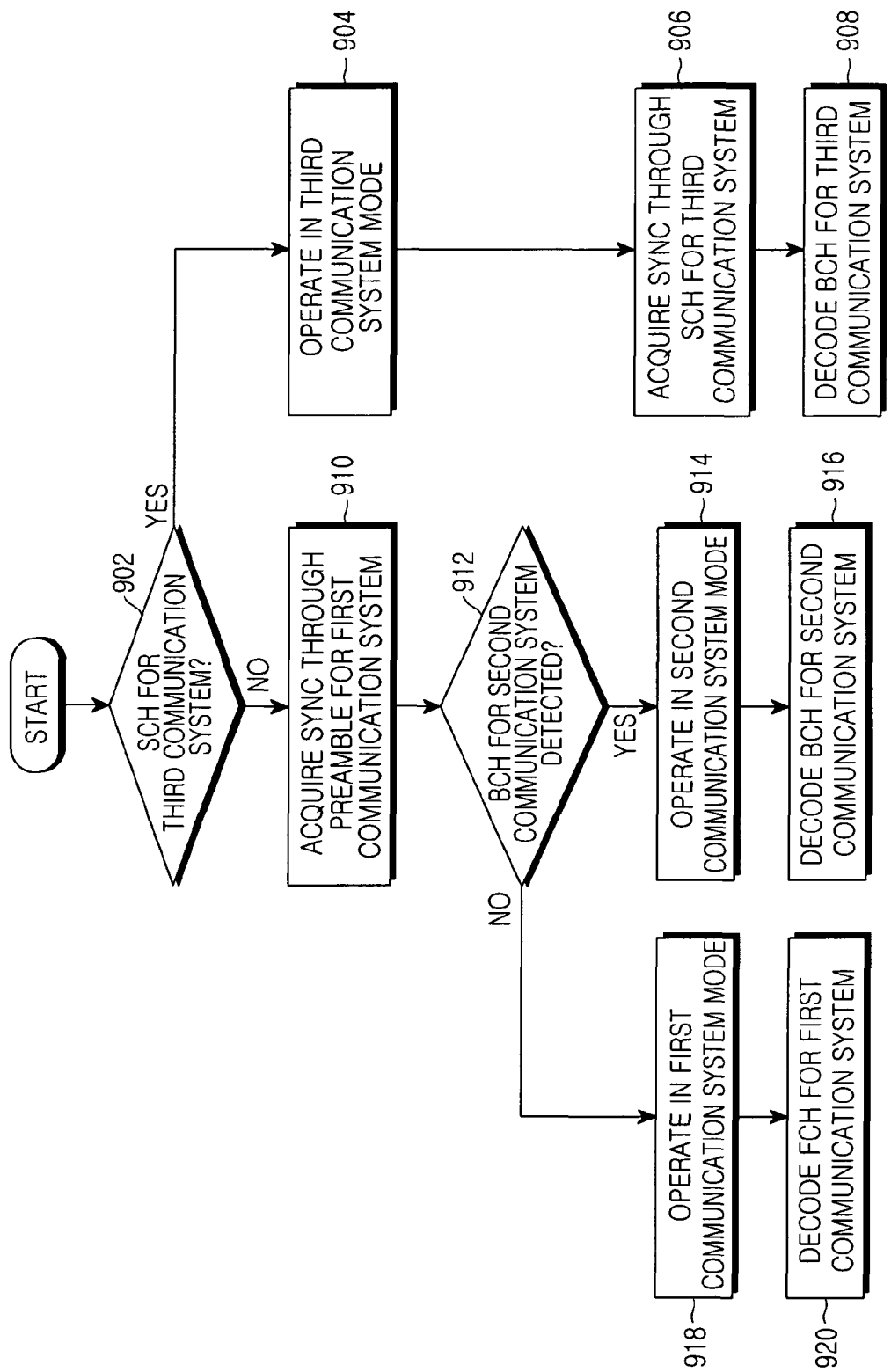
FIG. 9 is a flowchart illustrating a procedure of determining an operation mode of an MS in a communication system in accordance with an exemplary embodiment of the present invention.

FIG. 9 illustrates a procedure of determining an operation mode of an MS in a communication system according to an exemplary embodiment of the present invention.

Referring to FIG. 9, in step 902, the MS determines if there is an SCH region for the third communication system. If a result of the determination in step 902 shows that there is an SCH region for the third communication system, the MS proceeds to step 904. In step 904, the MS recognizes that the third communication system is in operation, and then proceeds to step 906. In step 906, the MS acquires synchronization through the SCH region, and then proceeds to step 908. In step 908, the MS acquires control information and broadcast information for the third communication system by decoding the BCH including common control information and broadcast information.

Contrarily, if a result of the determination in step 902 shows that there is no SCH region for the third communication system, the MS proceeds to step 910. In step 901, the MS acquires synchronization by using a preamble signal of the first communication system, and then proceeds to step 912. In step 912, the MS determines if the BCH region for the second communication system exists in the frame. If the BCH region exists, the MS proceeds to step 914, and otherwise, proceeds to step 918.

In step 914, the MS recognizes that it must operate in the second communication system mode, and then proceeds to step 916. In step 916, the MS decodes the BCH for the second communication system.

In step 918, the MS recognizes that it must operate in the first communication system mode, and then proceeds to step 920. In step 920, the MS decodes the FCH for the first communication system. In the above description, the BCH for the second communication system may have the same form as or a different form from that of the BCH for the third communication system.

Figure 10:
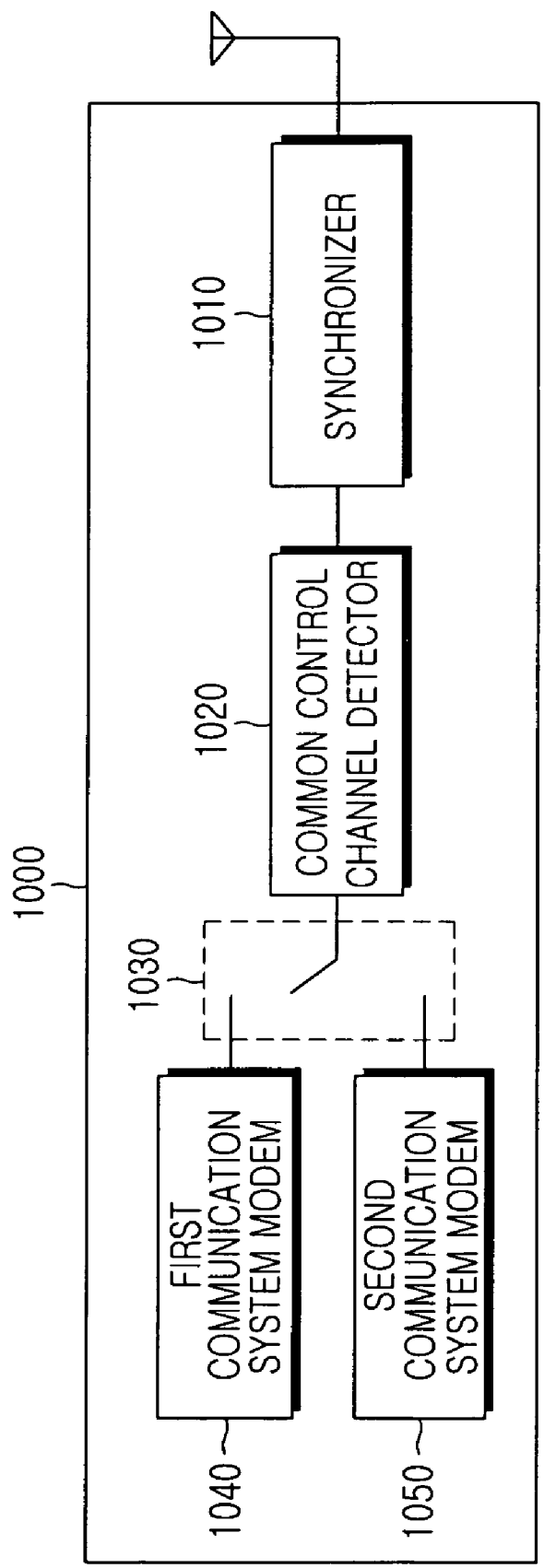
FIG. 10 is a view schematically illustrating a structure of an MS in a communication system in accordance with an exemplary embodiment of the present invention.

FIG. 10 schematically illustrates a structure of an MS in a communication system according to an exemplary embodiment of the present invention.

Referring to FIG. 10, the MS 1000 includes a synchronizer 1010 for acquiring synchronization by using the preamble signal transmitted through the preamble region, a common control information detector 1020 for detecting the BCH and the FCH to thereby determine an operation mode, and a switching unit 1030 for switching the MS to a first communication system modem 1040 or a second communication system modem 1050 so as to operate in the operation mode determined corresponding to whether or not the common control information is detected. Here, the operation of an MS in a communication system according to the present invention has been already described in detail in the foregoing, so a detailed description thereof will be omitted here for brevity.

Figure 11:
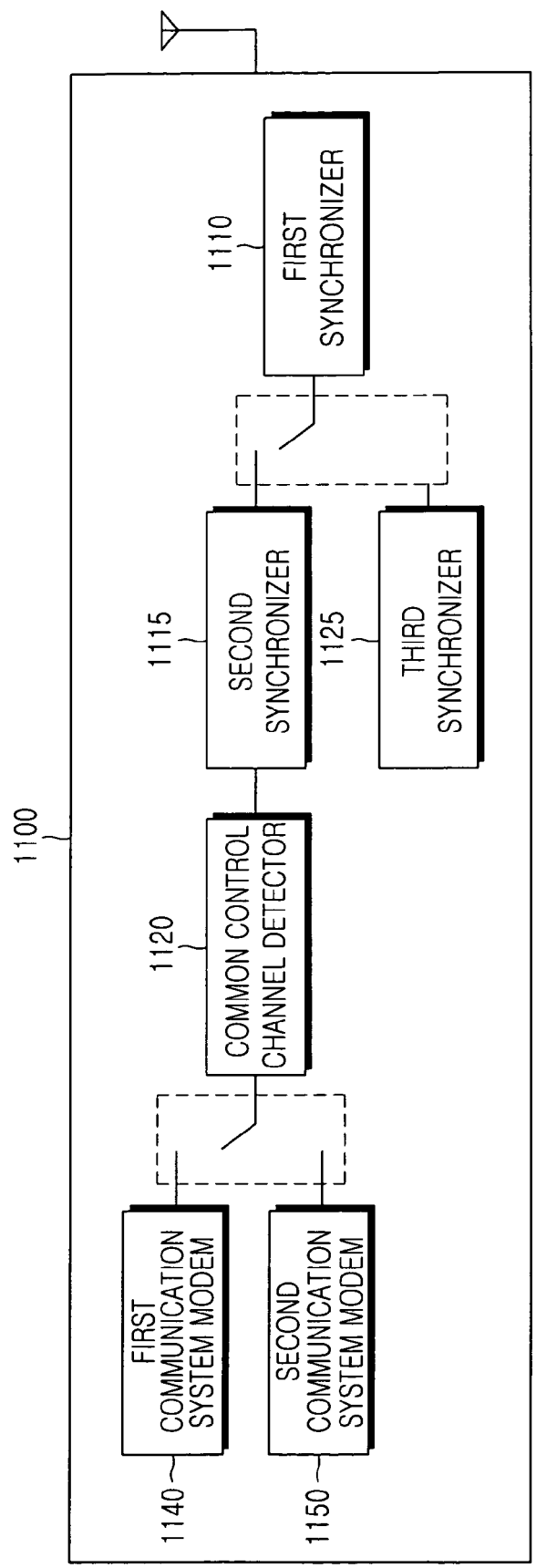
FIG. 11 is a view schematically illustrating a structure of an MS in a communication system in accordance with an exemplary embodiment of the present invention.

FIG. 11 schematically illustrates a structure of an MS in a communication system according to an exemplary embodiment of the present invention.

Referring to FIG. 11, the MS 1100 includes a first synchronizer 1110 for acquiring synchronization by detecting the SCH so as to synchronize the third communication system, a switching unit for switching the MS to a third synchronizer 1125 or a second synchronizer 1115 according to whether or not the SCH is detected, a common control channel detector 1120, a first communication system modem 1140, and a second communication system modem 1150.

If the SCH for the third communication system is detected by the first synchronizer 1110, the MS 1100 operates in such a manner as to be compatible with the third communication system. When the SCH is not detected, the second synchronizer 1115 acquires synchronization by using the preamble signal transmitted in the first communication system. The common control channel detector 1120 can determine an operation mode by detecting the BCH for the second communication system. The operation mode of the MS is determined as described above, so a detailed description thereof will be omitted here for brevity.

Figure 12:
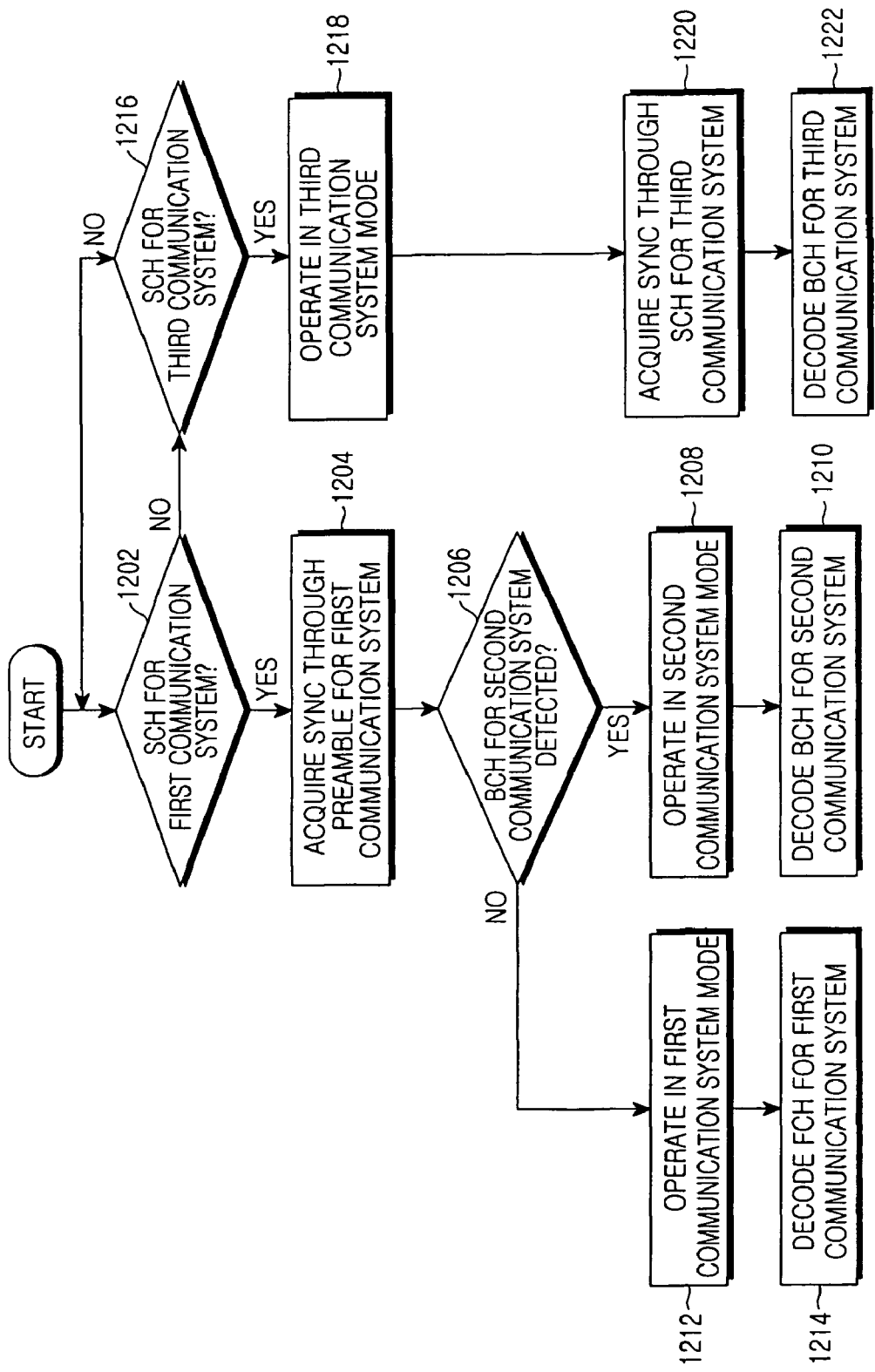
FIG. 12 is a flowchart illustrating a procedure of determining an operation mode of an MS in a communication system in accordance with an exemplary embodiment of the present invention.

FIG. 12 illustrates a procedure of determining an operation mode of an MS in a communication system according to an exemplary embodiment of the present invention.

Referring to FIG. 12, in step 1202, the MS determines if the SCH region for the first communication system, that is, the RS region, exists in the frame. If a result of the determination in step 1202 shows that the SCH region for the first communication system exists in the frame, the MS proceeds to step 1204. In step 1204, the MS acquires synchronization by using the preamble for the first communication system, and then proceeds to step 1206. In step 1206, the MS determines if the BCH for the second communication system can be detected. If a result of the determination in step 1206 shows that the BCH is detected, the MS proceeds to step 1208. In step 1208, the MS operates in the first communication system mode, and proceeds to step 1210. In step 1210, the MS decodes the BCH for the second communication system.

Contrarily, if a result of the determination in step 1206 shows that the BCH is unsuccessfully detected, the MS recognizes in step 1212 that it must operate in the first communication system mode, and then proceeds to step 1214. In step 1214, the MS decodes the FCH for the first communication system.

When a result of the determination in step 1202 shows that the SCH is not for the first communication system, the MS determines in step 1216 if there is the SCH for the third communication system. If a result of the determination in step 1216 shows that the SCH exists, the MS proceeds to step 1218. In step 1218, the MS operates in the third communication system mode, and proceeds to step 1220. In step 1220, the MS acquires synchronization through the SCH for the third communication system, and then proceeds to step 1222. In step 1222, the MS decodes the BCH for the third communication system.

According to the present invention as described above, a communication system in which first and second communication systems coexist can be efficiently operated by configuring a frame and providing indication information for the second communication system in the frame, and particularly it is possible to efficiently support the coexistence mode by improving BCH detection. Also, in the case of a third communication system in which the second communication system solely exists without coexisting with the first communication system, various system operation modes can be efficiently operated by providing an SCH for the third communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of transmitting a signal in a communication system in which a first communication system and a second communication system coexist, the second communication system being evolved from the first communication system and being capable of using a control signal and a broadcast signal used in the first communication system, the method comprising:
    transmitting a first message including common control information and frame control information for the first communication system in a first region of a frame;
    transmitting a second message including common control information and frame control information for the second communication system in a second region of the frame; and
    signaling location information of the transmitted second message in the second region.

2. The method as claimed in claim 1, wherein signaling the location information of the transmitted second message comprises transmitting the location information of the second message by using a signal characteristic/pattern in a frequency domain.

3. The method as claimed in claim 2, wherein the signal characteristic/pattern in the frequency domain comprises a reference signal pattern for a region through which to transmit the second message in the second region.

4. The method as claimed in claim 3, wherein a reference signal of the reference signal pattern comprises a pilot signal.

5. The method as claimed in claim 2, wherein the signal characteristic/pattern in the frequency domain comprises a prior signal pattern for a region through which to transmit the second message in the second region.

6. The method as claimed in claim 5, wherein a prior signal of the prior signal pattern comprises a preamble signal.

7. The method as claimed in claim 2, wherein signal characteristic/pattern in the frequency domain comprises a posterior signal pattern for a region through which to transmit the second message in the second region.

8. The method as claimed in claim 7, wherein a posterior signal of the posterior signal pattern comprises a preamble signal.

9. The method as claimed in claim 1, wherein signaling the location information of the transmitted second message comprises transmitting the location information of the second message by using a signal characteristic/pattern in a time domain.

10. The method as claimed in claim 9, wherein the signal characteristic/pattern in the time domain comprises a signal pattern obtained through a subcarrier set.

11. The method as claimed in claim 10, wherein signaling the location information of the transmitted second message comprises transmitting a sequence defined for the signal pattern obtained through the subcarrier set.

12. The method as claimed in claim 10, wherein the signal pattern obtained through the subcarrier set comprises a signal pattern using a set of identical subcarriers.

13. The method as claimed in claim 9, wherein the signal characteristic/pattern in the time domain comprises a signal pattern using a repetitive sequence in transmitting the second message.

14. The method as claimed in claim 13, wherein the signal pattern using the repetitive sequence comprises a signal pattern using each cyclic delay or cyclic shift of the repetitive sequence by a given size.

15. A method of receiving a signal in a communication system in which a first communication system and a second communication system coexist, the second communication system being evolved from the first communication system and being capable of using a control signal and a broadcast signal used in the first communication system, the method comprising:

receiving a first message including common control information and frame control information for the first communication system in a first region in a frame;
receiving a second message including common control information and frame control information for the second communication system in a second region in the frame; and
acquiring location information of the second message in the second region.

16. The method as claimed in claim 15, wherein acquiring the location information of the second message comprises detecting a signal pattern in a frequency domain, and acquiring the location information of the second message in correspondence with a correlation of the detected sign pattern.

17. The method as claimed in claim 16, wherein detecting the signal pattern in the frequency domain comprises detecting the signal pattern by measuring a correlation between a predefined sequence and a signal received in receiving the second message.

18. The method as claimed in claim 15, wherein acquiring the location information of the second message comprises detecting a signal pattern in a time domain, and acquiring the location information of the second message in correspondence with a correlation of the detected sign pattern.

19. The method as claimed in claim 16, wherein the step of acquiring the location information of the second message comprises measuring a correlation corresponding to a repetitive pattern in the time domain, and acquiring the location information of the second message by a repetitive characteristic according to the measured correlation.

20. The method as claimed in claim 15, wherein acquiring the location information of the second message comprises detecting a signal pattern in a time domain, measuring receive power for each subcarrier set of the detected signal pattern, and acquiring the location information of the second message in correspondence with the measured receive power.

21. The method as claimed in claim 15, wherein acquiring the location information of the second message comprises the step of detecting a signal pattern in a time domain, and further acquiring transit mode information of the second message in correspondence with the detected signal pattern.

22. The method as claimed in claim 21, wherein acquiring the transmit mode information of the second message further comprises providing communication services by the first communication system or providing communication services by the second communication system in correspondence with a transmit mode confirmed by the transmit mode information.

23. A system for transmitting a signal in a communication system in which a first communication system and a second communication system coexist, the second communication system being evolved from the first communication system and being capable of using a control signal and a broadcast signal used in the first communication system, the system comprising:
a base station configured to transmit a first message including common control information and frame control information for the first communication system in a first region in a frame, transmit a second message including common control information and frame control information for the second communication system in a second region in the frame, and signal location information of the transmitted second message in the second region.

24. The system as claimed in claim 23, wherein the base station transmits the location information of the second message by using a signal characteristic/pattern in a frequency domain.

25. The system as claimed in claim 24, wherein the signal characteristic/pattern in the frequency domain comprises a reference signal pattern for a region through which to transmit the second message in the second region.

26. The system as claimed in claim 25, wherein a reference signal of the reference signal pattern comprises a pilot signal.

27. The system as claimed in claim 24, wherein the signal characteristic/pattern in the frequency domain comprises a prior signal pattern for a region through which to transmit the second message in the second region.

28. The system as claimed in claim 27, wherein a prior signal of the prior signal pattern comprises a preamble signal.

29. The system as claimed in claim 24, wherein signal characteristic/pattern in the frequency domain comprises a posterior signal pattern for a region through which to transmit the second message in the second region.

30. The system as claimed in claim 29, wherein a posterior signal of the posterior signal pattern comprises a preamble signal.

31. The system as claimed in claim 23, wherein the base station transmits the location information of the second message by using a signal characteristic/pattern in a time domain.

32. The system as claimed in claim 31, wherein the signal characteristic/pattern in the time domain comprises a signal pattern obtained through a subcarrier set.

33. The system as claimed in claim 32, wherein the base station defines a sequence for the signal pattern obtained through the subcarrier set, and then signals and transmits the defined sequence.

34. The system as claimed in claim 32, wherein the signal pattern obtained through the subcarrier set comprises a signal pattern using a set of identical subcarriers.

35. The system as claimed in claim 31, wherein the signal characteristic/pattern in the time domain comprises a signal pattern using a repetitive sequence in transmitting the second message.

36. The system as claimed in claim 35, wherein the signal pattern using the repetitive sequence comprises a signal pattern using each cyclic delay or cyclic shift of the repetitive sequence by a given size.

37. A system for receiving a signal in a communication system in which a first communication system and a second communication system coexist, the second communication system being evolved from the first communication system and being capable of using a control signal and a broadcast signal used in the first communication system, the system comprising:
a mobile station configured to receive a first message including resource allocation information for the first communication system in a first region in a frame, receive a second message including resource allocation information for the second communication system in a second region in the frame, and acquire location information of the second message in the second region.

38. The system as claimed in claim 37, wherein the mobile station is configured to detect a signal pattern in a frequency domain, and acquire the location information of the second message in correspondence with a correlation of the detected sign pattern.

39. The system as claimed in claim 38, wherein the mobile station is configured to detect the signal pattern by measuring a correlation between a predefined sequence and a signal received in receiving the second message.

40. The system as claimed in claim 37, wherein the mobile station is configured to detect a signal pattern in a time domain, and acquire the location information of the second message in correspondence with a correlation of the detected sign pattern.

41. The system as claimed in claim 40, wherein the mobile station is configured to measure a correlation corresponding to a repetitive pattern in the time domain, and acquire the location information of the second message by a repetitive characteristic according to the measured correlation.

42. The system as claimed in claim 37, wherein the mobile station is configured to detect a signal pattern in a time domain, measure receive power for each subcarrier set of the detected signal pattern, and acquire the location information of the second message in correspondence with the measured receive power.

43. The system as claimed in claim 37, wherein the mobile station is configured to detect a signal pattern in a time domain, and further acquire transit mode information of the second message in correspondence with the detected signal pattern.

44. The system as claimed in claim 43, wherein the mobile station is provided with at least one of communication services from the first communication system; and communication services from the second communication system in correspondence with a transmit mode confirmed by the transmit mode information.

45. A method of receiving a signal in a communication system in which a third communication system including a first communication system and a second communication system evolved from and coexisting with the first communication system is mingled with a fourth communication system including only the second communication system, the method comprising the steps of:
   determining if a reference signal for the fourth communication system is received;
   when the reference signal for the fourth communication system is not received, receiving a reference signal for the first communication system, and acquiring synchronization;
   determining if common control information for the second communication system is received; and
   if the common control information for the second communication system is received, decoding the common control information for the second communication system.

46. The method as claimed in claim 45, further comprising receiving and decoding a frame control header for the first communication system when the common control information for the second communication system is not received.

47. The method as claimed in claim 45, further comprising:
   if the reference signal for the fourth communication system is received, acquiring synchronization with the fourth communication system; and
   receiving and decoding common control information for the fourth communication system.

48. The method as claimed in claim 45, wherein the reference signal for the fourth communication system comprises a unique signal.

49. The method as claimed in claim 45, wherein the reference signal for the fourth communication system indicates a location of the common control information.

50. A method of receiving common control information for a mobile station belonging to a second communication system in a communication system in which a first communication system and the second communication system coexist, the method comprising:
   receiving a first reference signal, and acquiring synchronization;
   determining if a second reference signal is received; and
   when a result of the determining shows that the second reference signal is received, receiving the common control information in a predetermined location.

51. The method as claimed in claim 50, wherein the first reference signal comprises a preamble signal used for acquiring synchronization for a mobile station belonging to the first communication system and the mobile station belonging to the second communication system.

52. The method as claimed in claim 50, wherein the second reference signal comprises a signal used for determining if the common control information for the mobile station belonging to the second communication system.

53. The method as claimed in claim 50, wherein the predetermined location comprises a location corresponding to at least one symbol interval following a symbol interval where the second reference signal is received.

54. The method as claimed in claim 50, wherein the predetermined location comprises a location corresponding to a region that is determined by at least one symbol interval following a symbol interval where the second reference signal is received, and a given frequency band.

* * * * *